US011067329B2

(12) United States Patent
Boer et al.

(10) Patent No.: US 11,067,329 B2
(45) Date of Patent: Jul. 20, 2021

(54) MULTIPLE TEMPERATURE AUTOMATED STORAGE SYSTEM AND METHOD

(71) Applicant: Dematic Corp., Grand Rapids, MI (US)

(72) Inventors: William R. Boer, Wayland, MI (US); Anthony W. Hasman, Howard City, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 16/697,468

(22) Filed: Nov. 27, 2019

(65) Prior Publication Data

US 2020/0166267 A1 May 28, 2020

Related U.S. Application Data

(60) Provisional application No. 62/772,408, filed on Nov. 28, 2018.

(51) Int. Cl.
*F25D 13/06* (2006.01)
*F25D 17/00* (2006.01)
*B65G 1/04* (2006.01)

(52) U.S. Cl.
CPC ........... *F25D 13/06* (2013.01); *B65G 1/0414* (2013.01); *B65G 1/0492* (2013.01); *F25D 17/005* (2013.01)

(58) Field of Classification Search
CPC .......... F25D 13/02; F25D 13/04; F25D 13/06; F25D 25/02; F25D 25/04; B65G 1/0414; B65G 1/0492
See application file for complete search history.

(56) References Cited

U.S. PATENT DOCUMENTS 5,002,449 A * 3/1991 Kita ..................... B65G 1/0492
414/273
5,167,575 A * 12/1992 MacDonald ............ E04B 2/827
454/187

(Continued)

FOREIGN PATENT DOCUMENTS

| CN | 107054958 A | 8/2017 |
|---|---|---|
| CN | 107902313 A | 4/2018 |
| EP | 1128140 B1 | 10/2003 |

OTHER PUBLICATIONS

International Search Report and Written Opinion of the International Searching Authority from corresponding Patent Cooperation Treaty (PCT) Application No. PCT/IB2019/060249, indicated completed on Feb. 28, 2020.

*Primary Examiner* — Kaitlin S Joerger
(74) *Attorney, Agent, or Firm* — Gardner, Linn, Burkhart & Ondersma LLP (57) ABSTRACT

A multiple temperature automated storage system includes a rack with multiple levels of shelves defining item storage positions, an aisle at each level, and a plurality of shuttles adapted to operate in the aisles for storing items to and retrieving items from the storage positions. A thermally insulated enclosure encloses some of the levels of the rack to define a low temperature zone with the remaining levels of the rack defining a higher temperature zone. A method of storing items at two different temperatures in a common automated storage system includes having a first portion of the automated storage system enclosed in a thermally insulated enclosure and a second portion of the automated storage system outside of the thermally insulated enclosure. A lift is provided in the second portion for supplying items to and retrieving items from both of the first and second portions, without entering the first portion.

39 Claims, 7 Drawing Sheets

(56) References Cited

U.S. PATENT DOCUMENTS

| | | |
|---|---|---|
| 9,630,777 B2 | 4/2017 | Yamashita |
| 10,124,341 B2 * | 11/2018 | Malin .................... F25D 25/04 |
| 10,202,240 B2 * | 2/2019 | De Angelis .......... B65G 1/0492 |
| 10,405,528 B2 * | 9/2019 | Comparat ............. A01K 67/033 |
| 10,769,587 B2 * | 9/2020 | Durkee ................... B65G 1/06 |
| 10,772,320 B2 * | 9/2020 | Malin .................. A01N 1/0242 |
| 10,934,918 B1 * | 3/2021 | Goffe ....................... B01J 29/76 |
| 2007/0065259 A1 * | 3/2007 | Talley .................. B65G 1/0407 |
| | | 414/279 |
| 2016/0130086 A1 * | 5/2016 | Yamashita ........... B65G 1/1373 |
| | | 414/807 |
| 2016/0376103 A1 | 12/2016 | De Angelis et al. |
| 2017/0029210 A1 | 2/2017 | Brzozka et al. |
| 2018/0134492 A1 * | 5/2018 | Lert, Jr. ............. G06Q 30/0643 |
| 2018/0150793 A1 * | 5/2018 | Lert, Jr. ............. G06Q 10/0833 |
| 2019/0009985 A1 * | 1/2019 | Lert, Jr. ............... B65G 1/0478 |
| 2020/0005229 A1 | 1/2020 | Durkee et al. |

\* cited by examiner

MULTIPLE TEMPERATURE AUTOMATED STORAGE SYSTEM AND METHOD

CROSS REFERENCE TO RELATED APPLICATION

The present application claims priority of U.S. provisional application Ser. No. 62/772,408 filed Nov. 28, 2018, which is hereby incorporated herein by reference in its entirety.

BACKGROUND OF THE INVENTION

Space in order fulfillment centers is typically constrained. Creating separate automated storage and retrieval systems for each of multiple temperature zones is space, capital, and labor intensive. Demand for frozen products is typically significantly less than chilled or ambient products, with only eight to ten percent of grocery store inventory volume typically dedicated to frozen items.

SUMMARY OF THE INVENTION

The present invention combines storage of multiple temperature zones, such as for chilled and frozen product, or ambient and chilled, or the like. The present invention provides a method and apparatus for automated storage and processing of orders on demand that include product, or items, stored in multiple temperature environments or zones, such as ambient, chilled and/or frozen. The invention is particularly useful in order fulfillment for e-commerce orders. While the invention has many applications, it is illustrated for use in micro fulfillment centers. The method and apparatus for automated storage and processing of orders on demand includes a modular automated storage and retrieval system, such as a modular shuttle based system with a portion of storage in the frozen temperature class and a portion of storage in the chilled temperature class that yields benefits in terms of space, capital, and operational efficiency.

In one form of the present invention, a multiple temperature automated storage system, according to an aspect of the invention, includes a rack having multiple levels of shelves defining item storage positions, an aisle at each level, and a plurality of shuttles adapted to operate in the aisles for storing items to the storage positions and retrieving items from the storage positions. A thermally insulated enclosure encloses some of the levels of the rack to define a low temperature zone with the remaining levels of the rack defining a higher temperature zone. A refrigeration system is included for lowering the temperature in the lower temperature zone.

The rack may be in a room at a temperature defining the temperature of the higher temperature zone, such as a temperature that is at least somewhat lower than the ambient temperature surrounding the room. A lift may be provided to supply items to and retrieve items from particular levels of the rack. The lift may be substantially entirely within the higher temperature zone.

A moveable air barrier may be provide between the lift and thermally insulated enclosure. The air barrier may include slideable doors or an air curtain such as an "air-knife". The lift may supply items to and retrieve items from the thermally insulated enclosure through the air barrier. A first buffer conveyer may be provided inside the thermally insulated enclosure adjacent the air barrier for buffering items for storage by a shuttle or retrieved from storage by the shuttle. A second buffer conveyor may be provided between the lift and the air barrier for buffering items supplied by the lift or awaiting retrieval by the lift. A second rack may be provided parallel to the rack and separated from the rack by the aisle, wherein the shuttle stores items to the storage positions and retrieves items from the storage positions in the rack and the second rack.

In one aspect, some of the shuttles may be limited to operation within the thermally insulated enclosure and other of the shuttles limited to operation outside of the thermally insulated enclosure. The shuttles are limited to only the interior or the exterior of the thermally insulated enclosure due to frost and condensation problems that may arise if the shuttle passes between the two temperature zones.

In another aspect, the rack of the multiple temperature automated storage system can be located adjacent to another rack that is located in a portion of the room at a temperature defining the temperature of another temperature zone. In yet another aspect, the temperature of the another temperature zone may be equal to the ambient temperature of the room.

According to another form of the present invention, a method and system for storing items at two different temperatures in a common automated storage system includes having a first portion of the automated storage system enclosed in a thermally insulated enclosure and a second portion of the automated storage system outside of the thermally insulated enclosure. The system includes a plurality of shuttles disposed in the first portion inside of the thermally insulated enclosure. The shuttles are operable for supplying items to and retrieving items from the first portion. The shuttles are limited to operation within the first portion inside of the thermally insulated enclosure. A lift is provided in the second portion for supplying items to and retrieving items from both of the first and second portions. The lift supplies items to and retrieves items from the second portion without entering the first portion, wherein the lift is substantially entirely located in the second portion. The method and system further including having a buffer for transporting items between the lift and the shuttles through the thermally insulated enclosure.

In one aspect, an air barrier, such as a slideable door or an air curtain such as an "air-knife", is provided through the thermally insulated enclosure proximate the lift and the buffer. The air barrier reduces air from escaping and temperature fluctuations inside of the thermally insulated enclosure by limiting air transfers through the buffer. The lift supplies items to and retrieves items from the second portion through the air barrier. The buffer may include a buffer conveyor provided on each side of the air barrier. The buffer conveyors transport items through the air barrier.

In another aspect, shuttles disposed inside the thermally insulated enclosure remain inside the enclosure at all times during operation. Exposure to temperature changes, such as by entering the chilled zone or ambient zone from the freezing zone can create frost and/or condensation on the shuttle that has been operating in the freezing temperature zone. Optionally, an additional or supplemental shuttle may be stored inside the thermally insulated enclosure, to take over if the main shuttle stops working or requires maintenance. The supplemental shuttle is already acclimated to the freezing temperatures and can take over for the main shuttle without a substantial delay and without being susceptible to condensation and/or frost.

In one form of the present invention, the chilled storage is provisioned above the frozen storage using common uprights that penetrate a thermal barrier between the two. These uprights support both frozen storage within the frozen enclosure and chilled storage above the enclosure. The common uprights may include insulation at the transition between the frozen and chilled storage portions. Conventional shuttles and rack conveyors are provisioned for use on both the frozen levels and the chilled levels. The same lift which services the frozen levels also services the chilled levels and is contained virtually entirely within the higher temperature, chilled zone.

Chilled and frozen product can thus be stored in the smallest space at the most efficient ratio in one aisle of the shuttle, without providing a separate rack or aisle for frozen product and a separate rack or aisle for the chilled product. If the percentage of business in frozen product increases, the number of levels within the frozen enclosure can be adjusted by raising the roof of the enclosure and increasing the sidewall heights. This provides flexibility to the embodiment.

These and other objects, advantages and features of this invention will become apparent upon review of the following specification in conjunction with the drawings.

DETAILED DESCRIPTION OF THE PREFERRED EMBODIMENT

Figure 1:
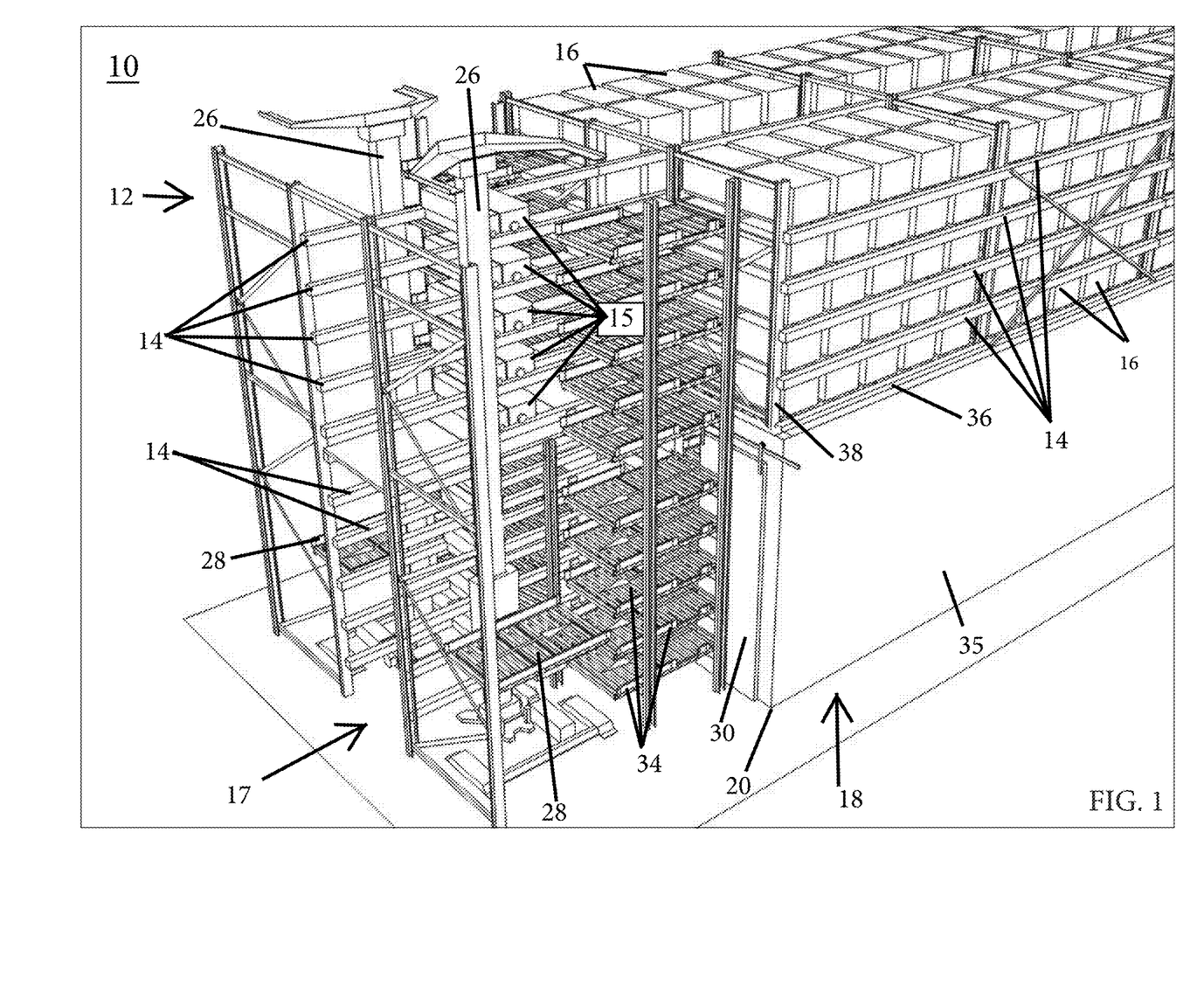
FIG. 1 is a perspective view of a multiple temperature automated storage system in accordance with an embodiment of the present invention, shown with an insulated enclosure surrounding a portion of the system.
Figure 2:
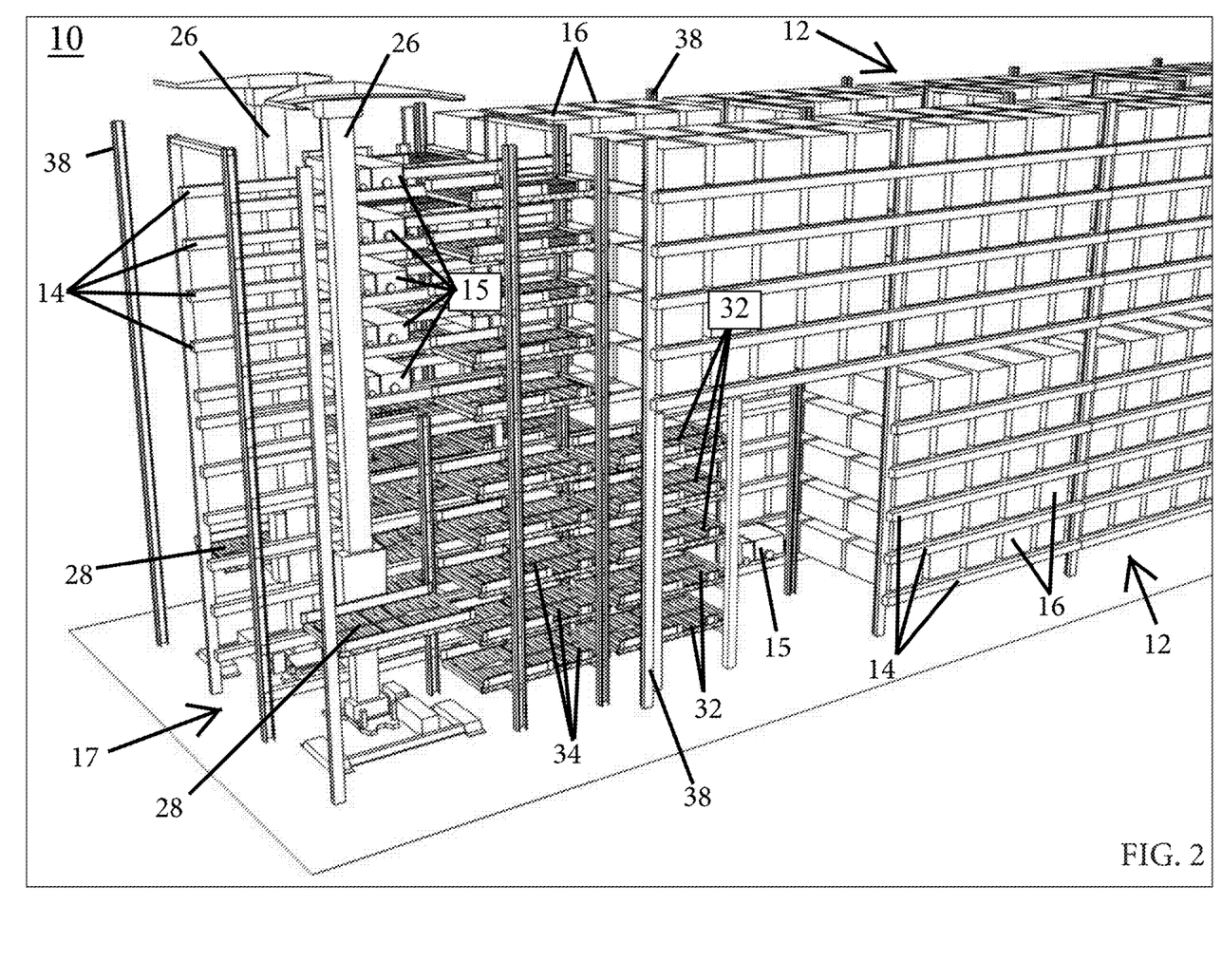
FIG. 2 is another perspective view of a multiple temperature automated storage system of FIG. 1, shown with the insulated enclosure and a portion of storage positions removed to reveal details of the storage positions and shuttle rails inside the insulated enclosure.
Figure 3:
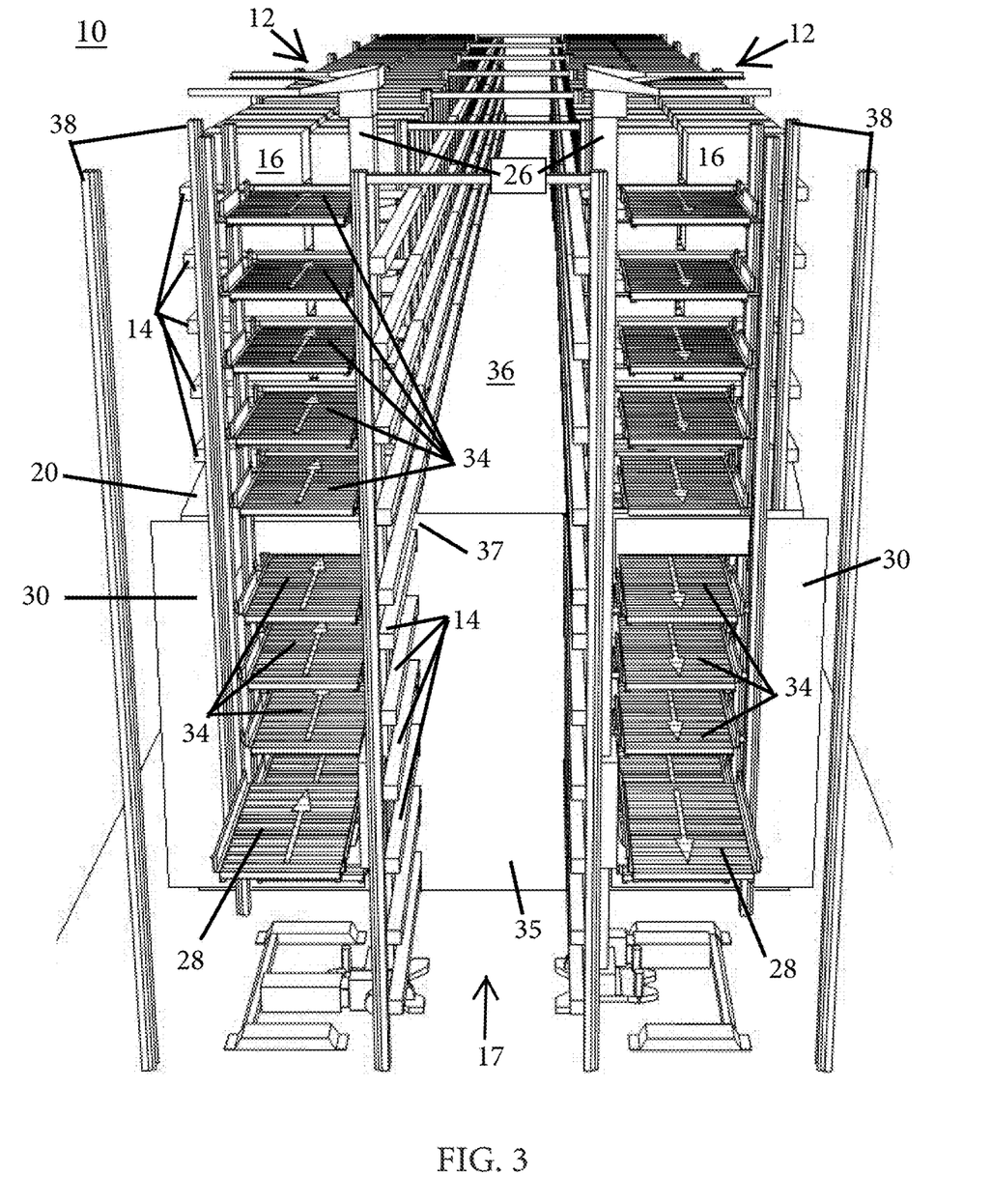
FIG. 3 is a front perspective view of the multiple temperature automated storage system of FIG. 1, shown with the insulated enclosure.
Figure 4:
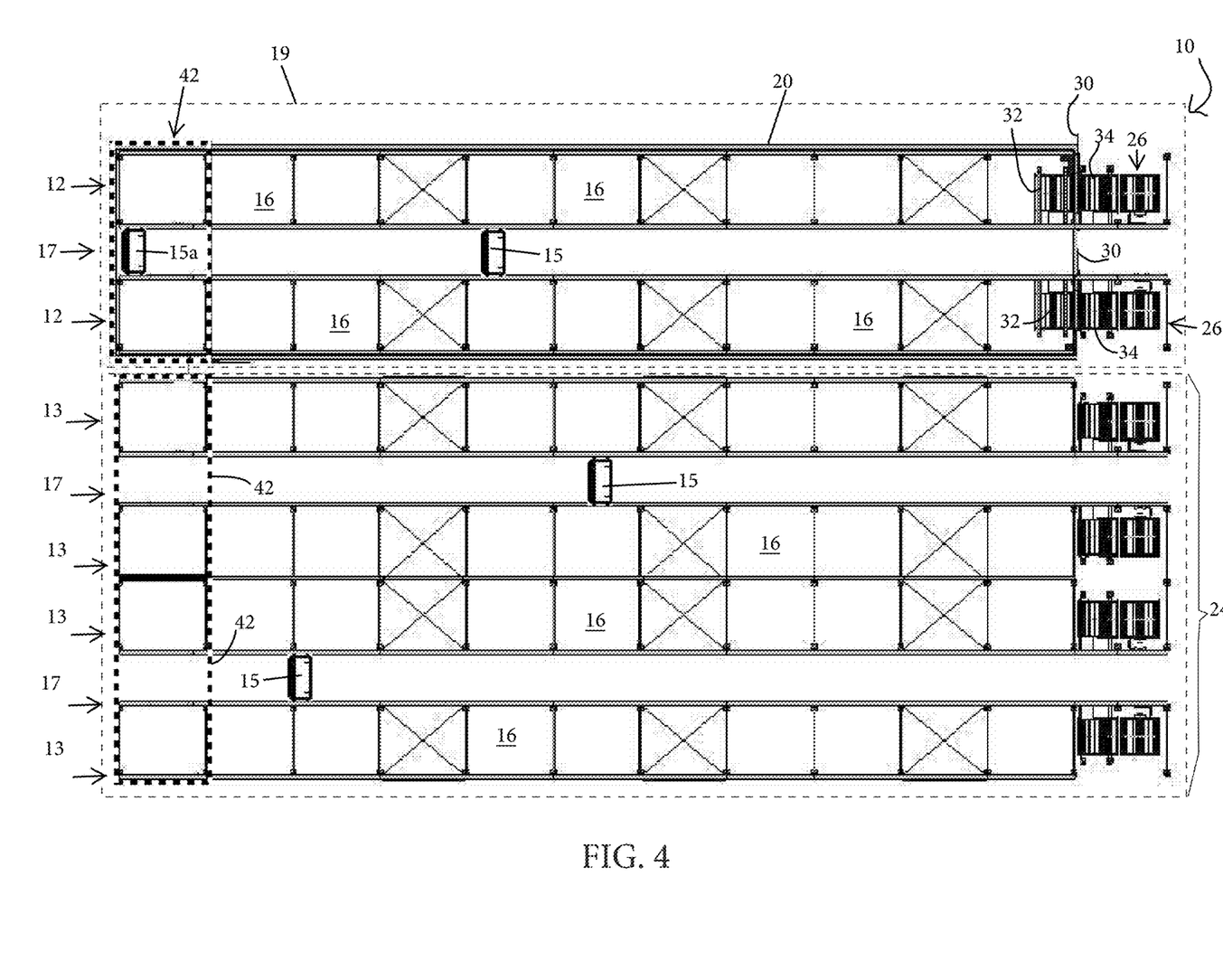
FIG. 4 is a top plan view of a multiple temperature automated storage system in accordance with an embodiment of the present invention.
Figure 5:
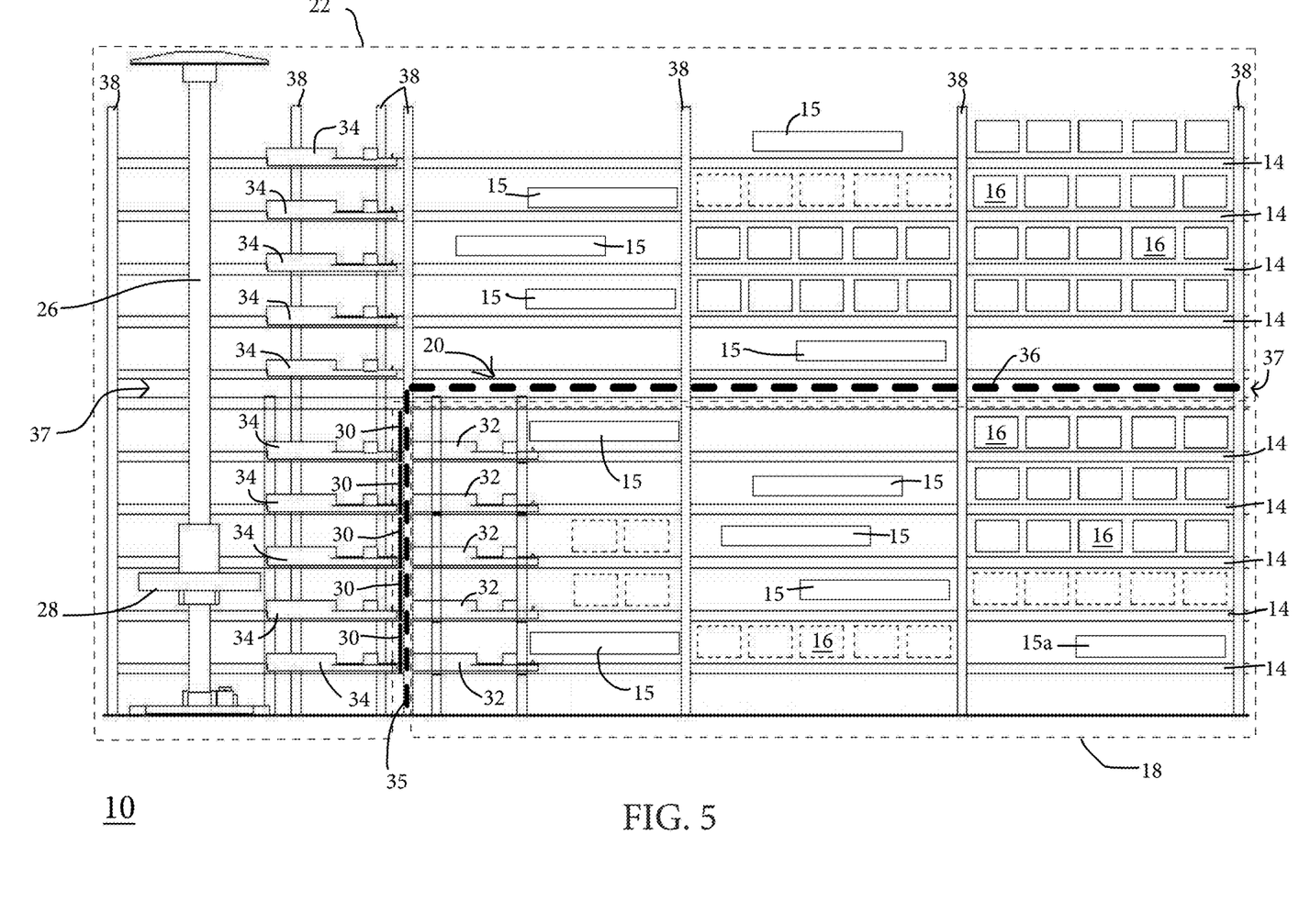
FIG. 5 is a side elevation of the multiple temperature automated storage system of FIG. 1.
Figure 6:
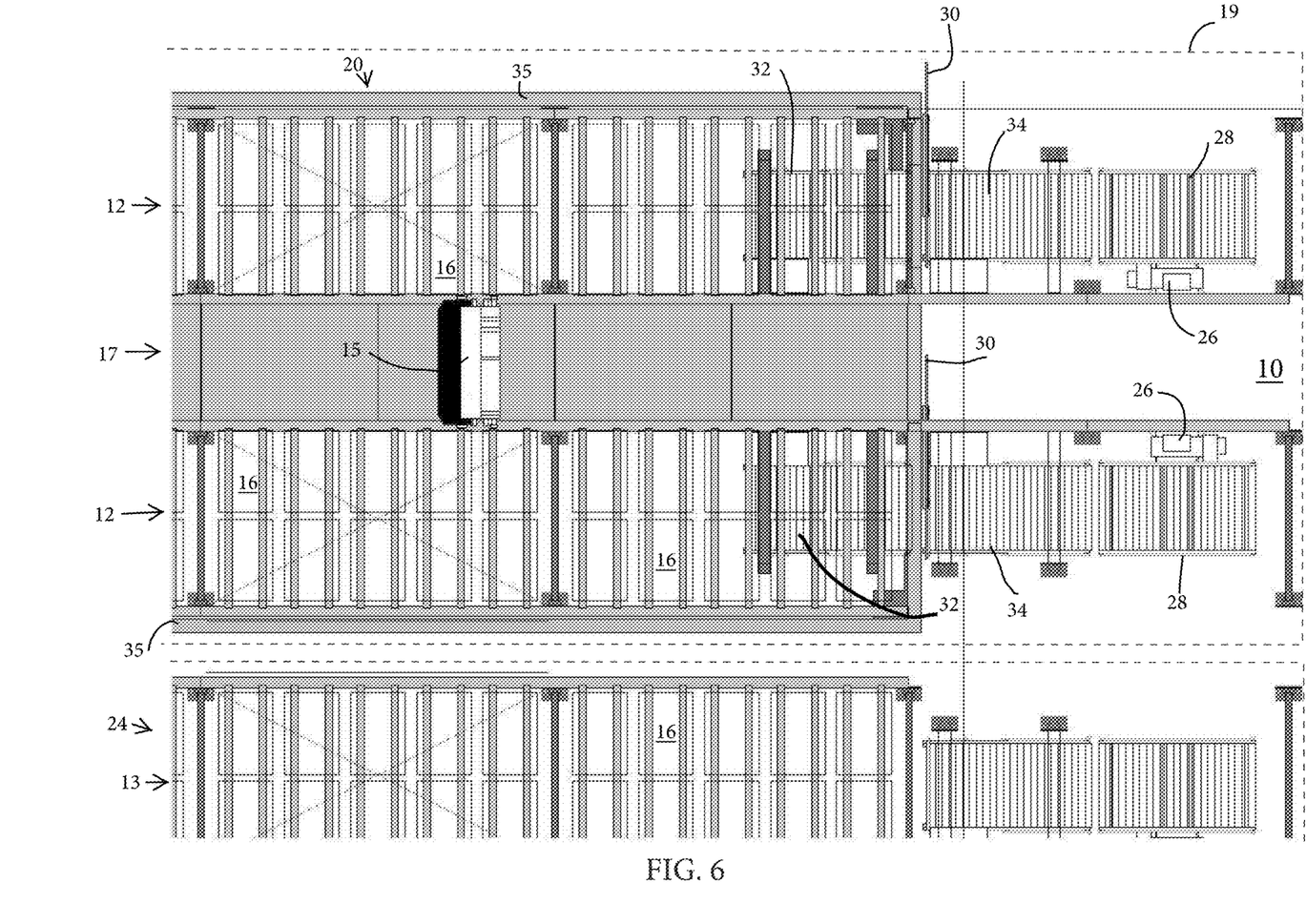
FIG. 6 is an enlarged top plan view of the multiple temperature automated storage system of FIG. 1.

Referring now to the drawings and the illustrative embodiments depicted therein, a multiple temperature automated storage system and method 10 includes a pair of spaced apart racks 12 having multiple levels 14 of shelves defining item storage positions 16 and an aisle 17 at each level. The aisle 17 is disposed between the pair of space apart racks 12 (FIGS. 1-4). A plurality of shuttles 15 are adapted to operate in aisles 17 for storing items to the storage positions 16 and retrieving items from the storage positions 16. Each shuttle 15 is adapted to store items to or retrieve items from storage positions 16 on either side of aisle 17. A lift 26 including a vertically moveable platform 28, supplies items to and retrieves items from particular levels 14 of the rack 12 for the shuttles 15 to store to the storage positions 16 and retrieve items from the storage positions 16 (FIGS. 1-3). Such automated storage system, or warehouse, may be of the type disclosed in commonly assigned U.S. Pat. No. 9,630,777, the disclosure of which is hereby incorporated herein by reference in its entirety. A thermally insulated enclosure 20 encloses some of the levels 14 of the rack 12 to define a low temperature zone 18 in order to store, for example, frozen items (FIGS. 1 and 5). The remaining levels 14 of the rack defining a higher temperature zone 22, in order to store, for example, chilled items. A refrigeration system (not shown) lowers the temperature in lower or frozen temperature zone 18. Each rack 12 is in a chilled room 19 at a temperature defining the temperature of higher or chilled temperature zone 22. Additional pairs of racks 13 may be installed adjacent to the pair of racks 12, and the additional racks may be maintained at higher or ambient temperature zone 24 to store, for example, items that do not require any form of refrigeration (FIGS. 4 and 6). Ambient temperature zone 24 may be the same temperature as higher temperature zone 22.

The lift 26 is located on the outside of the thermally insulated enclosure 20 and is substantially entirely within chilled temperature zone 22 (FIGS. 1, 3, and 4-5). A moveable air barrier 30 is included between lift 26 and thermally insulated enclosure 20 (FIGS. 1 and 3). Lift 26 supplies items to and retrieves items from the thermally insulated enclosure 20 through air barrier 30. While the air barrier 30 illustrated in FIGS. 1 and 3 is a door, other embodiments are contemplated, including air curtains, an "air knife", or the like. Typically, one air barrier 30 is be provided for each level 14 (FIG. 5). The air barrier 30 may be adapted to provide an opening for items or totes to pass from the frozen zone 18 to the chilled zone 22 through the insulated enclosure 20. The opening may remain open for the duration of an operating period when the multiple temperature automated storage system 10 is operating and be closed when the system 10 is not operating. Under such operating conditions, the air barrier 30 may include an air-knife to limit the air from the chilled zone 22 from entering into the freezer zone 18. Alternatively, the air barrier 30 may be adapted to open and close only when an item or tote needs to enter or leave the insulated enclosure 20.

Due to the temperature differences between the freezer zone 18 and the chilled zone 22, condensation may occur on the shuttle 15 if the shuttle 15 moves between the freezing zone 18 and the chilled zone 22 or ambient zone 24. In order to reduce or eliminate condensation, the shuttle 15 inside the thermally insulated enclosure 20 is not able to exit the enclosure 20. In this manner, there is a great reduction in the amount of frost build up on the equipment or items. An additional or supplemental shuttle 15a may be operably stored inside the thermally insulated enclosure 20, such that if the main shuttle 15 malfunctions or requires maintenance, the supplemental shuttle can take over for the main shuttle 15 without being susceptible to any significant condensation (FIGS. 4-5). A maintenance access area 42 may be provided at a back portion of the rack 12 and inside of the insulated enclosure 20 (FIG. 4). The supplemental shuttle 15a may be stored or staged in the maintenance access area 42 such that it does not interfere with operation of the shuttle 15 operating in the aisle 17.

An interior buffer conveyer 32 is provided inside the thermally insulated enclosure 20 adjacent the air barrier 30 for buffering items retrieved for storage by a shuttle 15 or retrieved from storage by the shuttle 15 (FIGS. 2 and 4-6). The shuttles 15 disposed inside of the insulated enclosure move items between the storage locations 16 and the interior buffer conveyer 32 to store the items in the rack 12 or to retrieve them from the rack 12. The interior buffer conveyor 32 receives items from the shuttle 15 and moves them through the air barrier 30 to an exterior buffer conveyer 34 that is outside of the insulated enclosure 20, or the interior buffer conveyor 32 receives items from the exterior buffer conveyor 34 through the air barrier 30 and moves them to the shuttle 15 to be stored in the rack 12. In the case of the higher temperature zone 22, the shuttle 15 can directly access the exterior buffer conveyor 34 at a particular level to retrieve or place items. Thus, no interior buffer conveyor 32 is needed in the levels outside of the insulated enclosure 20. The exterior buffer conveyor 34 is provided between lift 26 and the air barrier for buffering items supplied by the lift or awaiting retrieval by the lift 26 (FIGS. 1-6). In this manner, lift 26 can operate independently of the shuttles 15 and vice versa. Items are transported through air barrier 30 by buffer conveyors 32 and 34.

The insulated enclosure 20 includes insulated walls 35 surrounding the freezer zone 18 to retain the frozen air inside of the freezer zone 18 (FIG. 1). An insulated upper surface or ceiling 36 of enclosure 20 is positioned between levels 14 of the rack 12. The insulated enclosure 20 can be positioned to enclose more or fewer levels 14 of the rack 12 as required due to volume and space requirements for frozen items. The upper surface 36 and the wall panels 35 can be reconfigured or replaced in order to increase or decrease the size of enclosure 20 if the space and volumes needs for frozen items change. The insulated upper surface 36 is typically disposed in a maintenance space 37 between two levels 14 of the rack 12 (see FIGS. 3 and 5). The maintenance space 37 allows a user or technician an access space to perform maintenance on a portion of the rack 12 without removal items from the storage positions 16. The maintenance space 37 may be provided at intervals between levels 14, such as if every fifth level includes a maintenance space 37. The insulated enclosure 20 can thus be fixed at a height corresponding to the maintenance space 37, and can later be reconfigured to increase or decrease the volume of the freezer zone 18 as required for storage of inventory, according to the spacing of the maintenance spaces 37. The insulated enclosure 20 encloses the maintenance access area 42 at the back of the rack 12.

The freezer zone 18 is located below the chilled zone 22 because the density of frozen air is higher than the density of the chilled air, and the denser frozen air sinks below the chilled air, therefore it is most efficient to locate the freezer zone 18 below the chilled zone 22. The chilled zone 22 is provisioned above the frozen zone 18 using common uprights 38 that penetrate the thermal barrier 20 between the chilled zone 22 and frozen zone 18 (FIGS. 1 and 5). The uprights 38 may include insulation or shielding around the uprights 38 at least at the intersection between the upper surface 36 and the upright 38 to reduce heat transfer between the chilled zone 22 and the freezer zone 18 through the upright 38.

Figure 7:
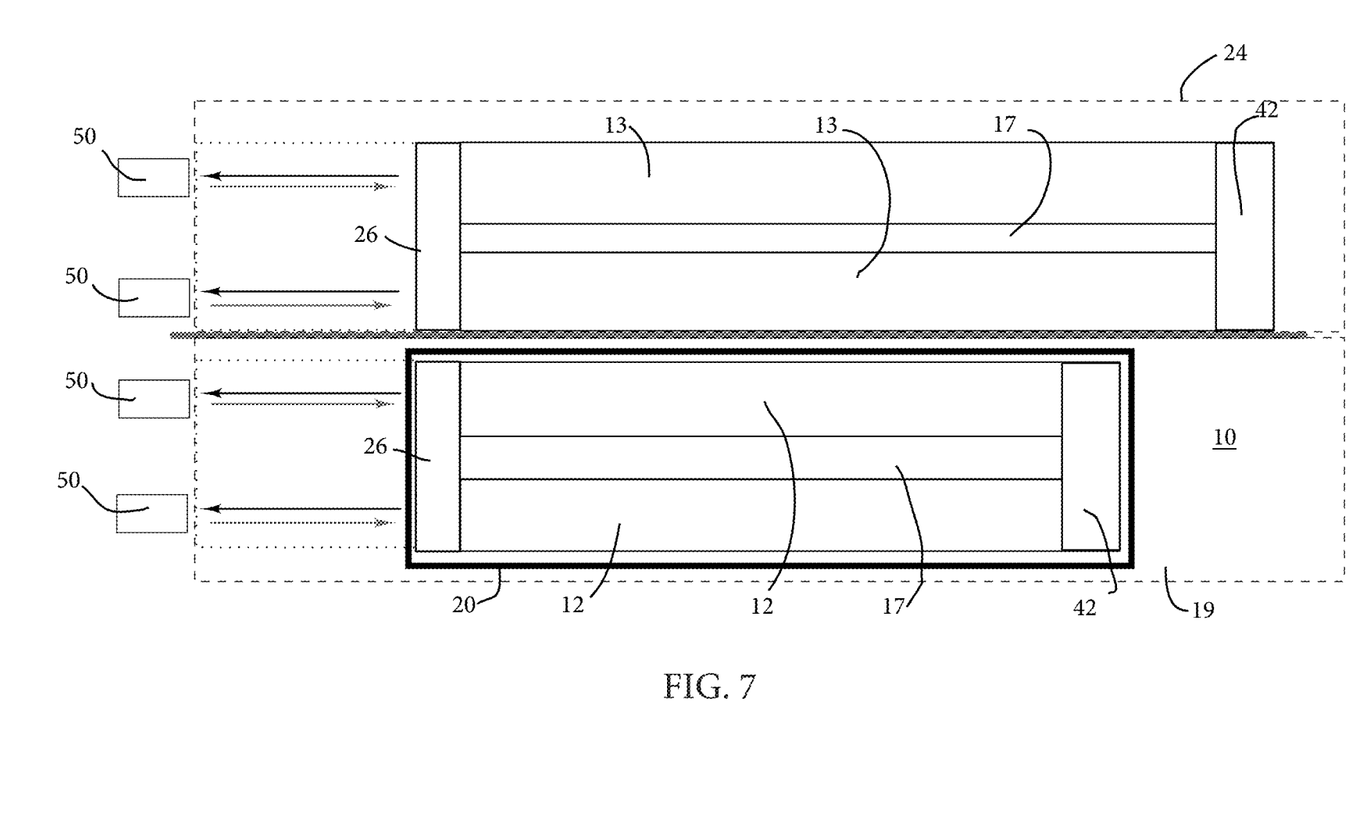
FIG. 7 is a diagram of a multiple temperature automated storage system and method in accordance with an embodiment of the present invention.

A pick station 50 may be included with the multiple temperature automated storage system 10 to pick items stored to or received from the system 10 (FIG. 7). Each rack 12 may include a pick station 50. The pick station 50 may include a goods-to-person pick station or a goods-to-robot pick station. An exemplary pick station is disclosed in commonly assigned U.S. Pat. No. 10,301,113, the disclosure of which is hereby incorporated herein by reference in its entirety.

Thus, chilled and frozen products can be stored in the smallest possible space inside of a warehouse, distribution center, or store with storage increments less than one aisle of shuttle or full storage rack. The multiple temperature automated storage system provides efficient temperature control of products in an automated storage system without having to provide an independent storage space for chilled products and frozen products. The multiple temperature automated storage system can be located adjacent to an automated storage system or rack that is maintained at an ambient air temperature. Shuttles that operate in the freezer zone are limited to operation only inside the freezer zone and shuttles that operate in the chilled zone are limited to operation only inside the chilled zone. The limitation on operation zone reduces the risk of malfunction or failure of the shuttle due to condensation and/or frost.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A multiple temperature automated storage system, comprising:
    a rack having multiple levels of shelves defining item storage positons and an aisle at each level;
    a plurality of shuttles adapted to operate in said aisles for storing items to said storage positons and retrieving items from said storage positons; and
    a thermally insulated enclosure enclosing some of said levels of said rack to define a low temperature zone with the remaining levels of said rack defining a higher temperature zone;
    wherein some of said shuttles are limited to operation within said thermally insulated enclosure and other of said shuttles are limited to operation outside of said thermally insulated enclosure.

2. The automated storage system as claimed in claim 1 wherein said rack is in a room at a temperature defining the temperature of said higher temperature zone.

3. The automated storage system as claimed in claim 1 including a lift for supplying items to and retrieving items from particular levels of said rack, said lift comprises a platform configured to receive and support the items supplied to and retrieved from said particular levels, said platform is selectively operable to raise and lower relative to said levels of said rack.

4. The automated storage system as claimed in claim 3, wherein said lift is substantially entirely within the higher temperature zone.

5. The automated storage system as claimed in claim 4 including a moveable air barrier disposed through said thermally insulated enclosure proximate said lift, said platform of said lift supplying items to and retrieving items from said thermally insulated enclosure through said air barrier.

6. The automated storage system as claimed in claim 5 including a first buffer conveyer inside said thermally insulated enclosure adjacent said air barrier for buffering items for storage by a shuttle or retrieved from storage by the shuttle.

7. The automated storage system as claimed in claim 6 including a second buffer conveyor outside said thermally insulated enclosure adjacent said air barrier for buffering items supplied from outside said thermally insulated enclosure or awaiting retrieval at the outside of said thermally insulated enclosure.

8. The automated storage system as claimed in claim 1, further comprising a second rack having multiple levels of shelves defining item storage positons, said second rack parallel to said rack and separated from said rack by said aisle, wherein said plurality of shuttles are operable to store items to said storage positions and retrieving items from said storage positions in said rack and said second rack.

9. The automated storage system as claimed in claim 1, further comprising a supplemental shuttle operably disposed inside of said thermally insulated enclosure to take over for one of said shuttles in the event that one of said shuttles is no longer operable.

10. The automated storage system as claimed in claim 9, wherein said supplemental shuttle is operably disposed in a maintenance space that is located inside of a portion of said thermally insulated enclosure, such that said supplemental shuttle does not interfere with operation of said shuttle.

11. The automated storage system as claimed in claim 1, further comprising a refrigeration system to lower the temperature in said lower temperature zone.

12. The automated storage system as claimed in claim 1, wherein said thermally insulated enclosure comprises an insulating layer disposed inside of a maintenance level of said rack, said maintenance level defining a maintenance access to allow an operator to perform maintenance on a portion of said rack.

13. The automated storage system as claimed in claim 1, further comprising another rack and another plurality of shuttles that are disposed adjacent to said rack of said automated storage and retrieval system, said another rack and said another shuttles are located in a portion of the room at a temperature defining the temperature of another temperature zone.

14. The automated storage system as claimed in claim 13, wherein the temperature of said another temperature zone is equal to the ambient temperature of the room.

15. A multiple temperature automated storage system, comprising:
   a first portion enclosed in a thermally insulated enclosure;
   a second portion outside of said thermally insulated enclosure;
   a lift disposed substantially entirely in said second portion outside of said thermally insulated enclosure, said lift selectively operable to supply items to and retrieve items from said second portion;
   a plurality of shuttles disposed in said first portion inside of said thermally insulated enclosure, said shuttles supplying items to and retrieving items from said first portion; and
   a buffer disposed between said lift and said shuttles, said buffer operable to transport items through said thermally insulated enclosure;
   wherein said buffer is operable to transfer items from said first portion to said second portion and from said second portion to said first portion; and
   wherein said shuttles limited to operation within said first portion inside said thermally insulated enclosure.

16. The automated storage system as claimed in claim 15 including an air barrier disposed through said thermally insulated enclosure proximate said lift, said buffer transporting items between said first portion and said second portion through said air barrier.

17. The automated storage system as claimed in claim 16, wherein said buffer comprises a buffer conveyor on each side of said air barrier, said buffer conveyors transporting items through said air barrier.

18. The automated storage system as claimed in claim 17 wherein the automated storage system includes a rack having multiple levels of shelves defining item storage positons and an aisle at each level, said plurality of shuttles adapted to operate in said aisles for storing items to said storage positons and retrieving items from said storage positons.

19. The automated storage system as claimed in claim 18, wherein said thermally insulated enclosure comprises an insulating layer disposed inside of a maintenance level of said rack, said maintenance level defining a maintenance access to allow an operator to perform maintenance on a portion of said rack.

20. The automated storage system as claimed in claim 18, wherein the automated storage system includes a supplemental shuttle operably disposed inside of said thermally insulated enclosure to take over for one of said shuttles in the event that one of said shuttles is no longer operable.

21. The automated storage system as claimed in claim 20, wherein said supplemental shuttle is operably disposed in a maintenance space that is located inside of a portion of said thermally insulated enclosure, such that said supplemental shuttle does not interfere with operation of said shuttle.

22. The automated storage system as claimed in claim 15, wherein the automated storage system includes a refrigeration system to lower the temperature inside of said thermally insulated enclosure.

23. A method of storing items at two different temperatures in a common automated storage system, comprising:
   having a first portion of said automated storage system enclosed in a thermally insulated enclosure and a second portion of said automated storage system outside of said thermally insulated enclosure;
   having a lift disposed substantially entirely in said second portion outside of said thermally insulated enclosure, said lift supplying items to and retrieving items from said second portion;
   having a plurality of shuttles disposed in said first portion inside of said thermally insulated enclosure, said shuttles supplying items to and retrieving items from said first portion; and
   having a buffer transporting items between said lift and said shuttles through said thermally insulated enclosure.

24. The method as claimed in claim 23 including an air barrier disposed through said thermally insulated enclosure proximate said lift, said buffer transporting items between said first portion and said second portion through said air barrier.

25. The method as claimed in claim 24, wherein said buffer including a buffer conveyor on each side of said air barrier, said buffer conveyors transporting items through said air barrier.

26. The method as claimed in claim 23 wherein said shuttles are limited to operating within said first portion inside said thermally insulated enclosure.

27. The method as claimed in claim 26 wherein the automated storage system includes a rack having multiple levels of shelves defining item storage positons and an aisle at each level, wherein said plurality of shuttles are adapted to operate in said aisles for storing items to said storage positons and retrieving items from said storage positons.

28. The automated storage system as claimed in claim 27, wherein said thermally insulated enclosure comprises an insulating layer disposed inside of a maintenance level of said rack, said maintenance level defining a maintenance access to allow an operator to perform maintenance on a portion of said rack.

29. The method as claimed in claim 27, wherein the automated storage system includes a supplemental shuttle operably disposed inside of said thermally insulated enclosure to take over for one of said shuttles in the event that one of said shuttles is no longer operable.

30. The method as claimed in claim 29, wherein said supplemental shuttle is operably disposed in a maintenance space that is located inside of a portion of said thermally insulated enclosure, such that said supplemental shuttle does not interfere with operation of said shuttle.

31. The method as claimed in claim 23, wherein the automated storage system includes a refrigeration system to lower the temperature inside of said thermally insulated enclosure.

32. A method of storing items at two different temperatures in a common automated storage system, comprising:
having a rack including multiple levels of shelves defining item storage positons with an aisle at each level;
having a plurality of shuttles operating in said aisles, said shuttles storing items to said storage positons and retrieving items from said storage positons; and
having a thermally insulated enclosure enclosing some of said levels of said rack to define a low temperature zone with the remaining levels of said rack defining a higher temperature zone;
wherein some of said shuttles are limited to operating in said low temperature zone within said thermally insulated enclosure and other of said shuttles are limited to operation in said higher temperature zone outside of said thermally insulated enclosure.

33. The method as claimed in claim 32 including a lift for supplying items to and retrieving items from particular of said levels of said rack, said lift comprising a platform configured to receive and support the items supplied to and retrieved from said particular levels, said platform is selectively operable to raise and lower relative to said levels of said rack.

34. The method as claimed in claim 33, wherein said lift is substantially entirely within said higher temperature zone.

35. The method as claimed in claim 34 including a moveable air barrier disposed through said thermally insulated enclosure proximate said lift, said platform of said lift supplying items to and retrieving items from said thermally insulated enclosure through said air barrier.

36. The method as claimed in claim 35 including a first buffer conveyer inside said thermally insulated enclosure adjacent said air barrier and a particular level of said rack for buffering items for storage by a shuttle at that particular level or retrieved from storage by the shuttle at that particular level.

37. The method as claimed in claim 36 including a second buffer conveyor outside said thermally insulated enclosure adjacent said air barrier and a particular level of said rack for buffering items supplied by said platform of said lift or awaiting retrieval by said platform of said lift proximate that particular level of said rack.

38. The method as claimed in claim 32, wherein the automated storage system includes a refrigeration system to lower the temperature inside of said thermally insulated enclosure.

39. The automated storage system as claimed in claim 32, wherein said thermally insulated enclosure comprises an insulating layer disposed inside of a maintenance level of said rack, said maintenance level defining a maintenance access to allow an operator to perform maintenance on a portion of said rack.

* * * * *